US007704137B2

(12) United States Patent
Englman

(10) Patent No.: US 7,704,137 B2
(45) Date of Patent: Apr. 27, 2010

(54) GAMING MACHINE WITH FEATURE TRIGGERING SCHEME

(75) Inventor: Allon G. Englman, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1051 days.

(21) Appl. No.: 10/760,699

(22) Filed: Jan. 20, 2004

(65) Prior Publication Data

US 2005/0159211 A1 Jul. 21, 2005

(51) Int. Cl.
*A63F 13/00* (2006.01)

(52) U.S. Cl. .............................. 463/16; 463/20; 463/21; 273/138.1; 273/139

(58) Field of Classification Search ..................... 463/1, 463/16–21, 23, 25–34, 10–13; 273/138.1, 273/138.2, 141 A, 142 B, 142 C, 142 J, 139, 273/148 R, 429–432
See application file for complete search history.

(56) References Cited

U.S. PATENT DOCUMENTS 4,993,713 A * 2/1991 Harada ........................ 463/25
5,833,538 A * 11/1998 Weiss .......................... 463/21
6,033,307 A * 3/2000 Vancura ....................... 463/20
6,146,273 A * 11/2000 Olsen .......................... 463/27
6,159,098 A * 12/2000 Slomiany et al. ............. 463/25
6,203,429 B1 * 3/2001 Demar et al. ................. 463/20
6,254,483 B1 7/2001 Acres .......................... 463/26
6,358,149 B1 * 3/2002 Schneider et al. ............ 463/27
6,565,436 B1 * 5/2003 Baerlocher ................... 463/26
6,569,016 B1 * 5/2003 Baerlocher ................... 463/16
6,676,516 B2 * 1/2004 Baerlocher et al. ............ 463/25
6,679,492 B2 * 1/2004 Markowiak .............. 273/138.1
6,783,457 B2 * 8/2004 Hughs-Baird et al. ......... 463/20
6,793,575 B2 * 9/2004 Brown et al. .................... 463/6
6,796,900 B2 * 9/2004 Baerlocher et al. ............ 463/16
6,811,486 B1 * 11/2004 Luciano, Jr. ................. 463/24
6,890,257 B2 * 5/2005 Baerlocher ................... 463/25
6,913,532 B2 * 7/2005 Baerlocher et al. ............ 463/16
6,939,227 B2 * 9/2005 Jorasch et al. ................ 463/20
6,939,230 B2 * 9/2005 Vancura ....................... 463/25
6,986,709 B2 * 1/2006 Hughs-Baird et al. ......... 463/16
7,108,603 B2 * 9/2006 Olive .......................... 463/27
7,201,657 B2 * 4/2007 Baerlocher et al. ............ 463/20
7,297,059 B2 * 11/2007 Vancura et al. ............... 463/27
2001/0009865 A1 * 7/2001 Demar et al. ................. 463/20
2001/0036857 A1 * 11/2001 Mothwurf et al. ............. 463/25

(Continued)

FOREIGN PATENT DOCUMENTS

EP 1 125 605 8/2000
JP 2003093647 4/2003
WO WO0126019 A1 * 4/2001

OTHER PUBLICATIONS

GB Search Report for GB Application Serial No. GB0427471.8 dated May 19, 2005 (1 page).

*Primary Examiner*—Dmitry Suhol
*Assistant Examiner*—Arthur O. Hall
(74) *Attorney, Agent, or Firm*—Nixon Peabody LLP

(57) ABSTRACT

A gaming apparatus and method of conducting a wagering game are disclosed. The wagering game includes a basic game and a bonus game triggered by the basic game. The apparatus tracks a number of the basic games played since a predetermined event, and alters a probability of triggering the bonus game based on the tracked number.

21 Claims, 9 Drawing Sheets

| Game Play Counter 28 | Bonus Hit Rate 29 | Return in Bonus 30 | Bonus EV 31 | Reels EV 32 |
|---|---|---|---|---|
| 1 - 40 | 1 in 100 | 20 times bet | 20% (20/100) | 72% (92% - bonus EV) |
| 41 - 80 | 1 in 80 | 20 times bet | 25% (20/80) | 67% (92% - bonus EV) |
| 81 - 110 | 1 in 60 | 20 times bet | 33% (20/60) | 59% (92% - bonus EV) |
| 111 - 150 | 1 in 50 | 20 times bet | 40% (20/50) | 54% (94% - bonus EV) |
| 151 + | 1 in 30 | 20 times bet | 66% (20/30) | 30% (96% - bonus EV) |

EV = expected value

U.S. PATENT DOCUMENTS

| | | | | |
|---|---|---|---|---|
| 2001/0049298 | A1* | 12/2001 | Bennett | 463/16 |
| 2002/0039919 | A1 | 4/2002 | Joshi et al. | 463/20 |
| 2002/0090990 | A1 | 7/2002 | Joshi et al. | 463/20 |
| 2002/0132660 | A1* | 9/2002 | Taylor | 463/16 |
| 2002/0151349 | A1 | 10/2002 | Joshi | 463/20 |
| 2002/0155883 | A1* | 10/2002 | Baerlocher | 463/25 |
| 2002/0160827 | A1* | 10/2002 | Slomiany et al. | 463/16 |
| 2003/0060252 | A1* | 3/2003 | Hughs-Baird et al. | 463/16 |
| 2003/0060272 | A1* | 3/2003 | Glavich et al. | 463/25 |
| 2003/0069073 | A1* | 4/2003 | Okada | 463/42 |
| 2003/0176220 | A1* | 9/2003 | Baerlocher | 463/26 |
| 2003/0222402 | A1* | 12/2003 | Olive | 273/292 |
| 2004/0033826 | A1* | 2/2004 | Berman | 463/16 |
| 2004/0043815 | A1* | 3/2004 | Kaminkow | 463/25 |
| 2004/0072613 | A1* | 4/2004 | Visocnik | 463/25 |
| 2004/0259631 | A1* | 12/2004 | Katz et al. | 463/25 |

* cited by examiner

| **Game Play Counter** 28 | **Bonus Hit Rate** 29 | **Return in Bonus** 30 | **Bonus EV** 31 | **Reels EV** 32 |
|---|---|---|---|---|
| 1 - 40 | 1 in 100 | 20 times bet | 20% (20/100) | 72% (92% - bonus EV) |
| 41 - 80 | 1 in 80 | 20 times bet | 25% (20/80) | 67% (92% - bonus EV) |
| 81 - 110 | 1 in 60 | 20 times bet | 33% (20/60) | 59% (92% - bonus EV) |
| 111 - 150 | 1 in 50 | 20 times bet | 40% (20/50) | 54% (94% - bonus EV) |
| 151 + | 1 in 30 | 20 times bet | 66% (20/30) | 30% (96% - bonus EV) |

EV = expected value

FIG. 3

| Game Play Counter 48 | Bonus Hit Rate 49 | Return in Bonus 50 | Bonus EV 51 | Reels EV 52 |
|---|---|---|---|---|
| 1 - 30 | 1 in 100 | 20 times bet | 20% (20/100) | 67% (87% - bonus EV) |
| 31 - 50 | 1 in 90 | 20 times bet | 22% (20/90) | 67% (89% - bonus EV) |
| 51 - 80 | 1 in 80 | 20 times bet | 25% (20/80) | 67% (92% - bonus EV) |
| 81 + | 1 in 70 | 20 times bet | 28% (20/70) | 67% (95% - bonus EV) |

EV = expected value

FIG. 9

GAMING MACHINE WITH FEATURE TRIGGERING SCHEME

FIELD OF THE INVENTION

The present invention relates generally to gaming machines and, more particularly, to a gaming machine with a meter or counter used to manage the bonus hit rate and vary the probability of triggering a bonus.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games that will attract frequent play by increasing the entertainment value and excitement associated with the game.

To meet the increasing expectations of players, gaming machines are becoming more sophisticated. New techniques and technologies must continue to be introduced to survive or excel in an extremely competitive market.

Traditional video slot machines have evolved into a more robust entertainment offering, providing players with bonus rounds to enhance the basic slot game. As players patronize these new games, more and more rely on bonus rounds as their main method of entertainment and, in many cases, a primary method of return during play. With increasing regularity, many players determine a slot game's value based on the entertainment of the bonus round(s) as well as the perceived frequency of bonus play. This trend will likely continue to grow as improved technologies allow gaming machine manufacturers the ability to produce more exciting and entertaining offerings, especially in bonus games.

As stated above, the perceived frequency at which a bonus game is triggered is becoming a critical factor in determining the value and popularity of many video slot machines. Many excellent games have caused the loss of a player's initial enthusiasm to participate because a bonus round failed to trigger, or triggered infrequently during basic reel play. For example, a game that is programmed to randomly trigger a bonus an average of once within 100 wagers can experience a span of nearly 200 wagers before another bonus round is initiated (one bonus near the beginning of the first 100 wagers and one bonus near the end of the second 100 wagers). Because this is a random event, a longer period between bonus rounds is possible. If this, or a frequency near this occurs often but still within the boundaries of the game's configuration, the player's perception may turn negative towards the game, thus reducing the number of potential return players and, subsequently, the number of plays.

A method of automatically increasing the probability of triggering a bonus game as the number of basic slot games increases since the last bonus game, and displaying the increased likelihood to the player in an entertaining manner, would help alleviate negative perceptions of slot games that players believe rely on bonus rounds as a main form of entertainment and return.

SUMMARY OF THE INVENTION

In accordance with the foregoing, a gaming apparatus and method of conducting a wagering game are disclosed. The wagering game includes a basic game and a bonus game triggered by the basic game. The apparatus tracks a number of the basic games played since a predetermined event, and alters a probability of triggering the bonus game based on the tracked number. The predetermined event may, for example, be triggering the bonus game or the start or completion of a gaming session.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The foregoing and other advantages of the invention will become apparent upon reading the following detailed description and upon reference to the drawings in which:

FIG. 3 is a table showing a bonus configuration scheme based on a game play counter;

FIG. 9 is a table showing an alternative bonus configuration scheme based on a game play counter.

Figure 1:
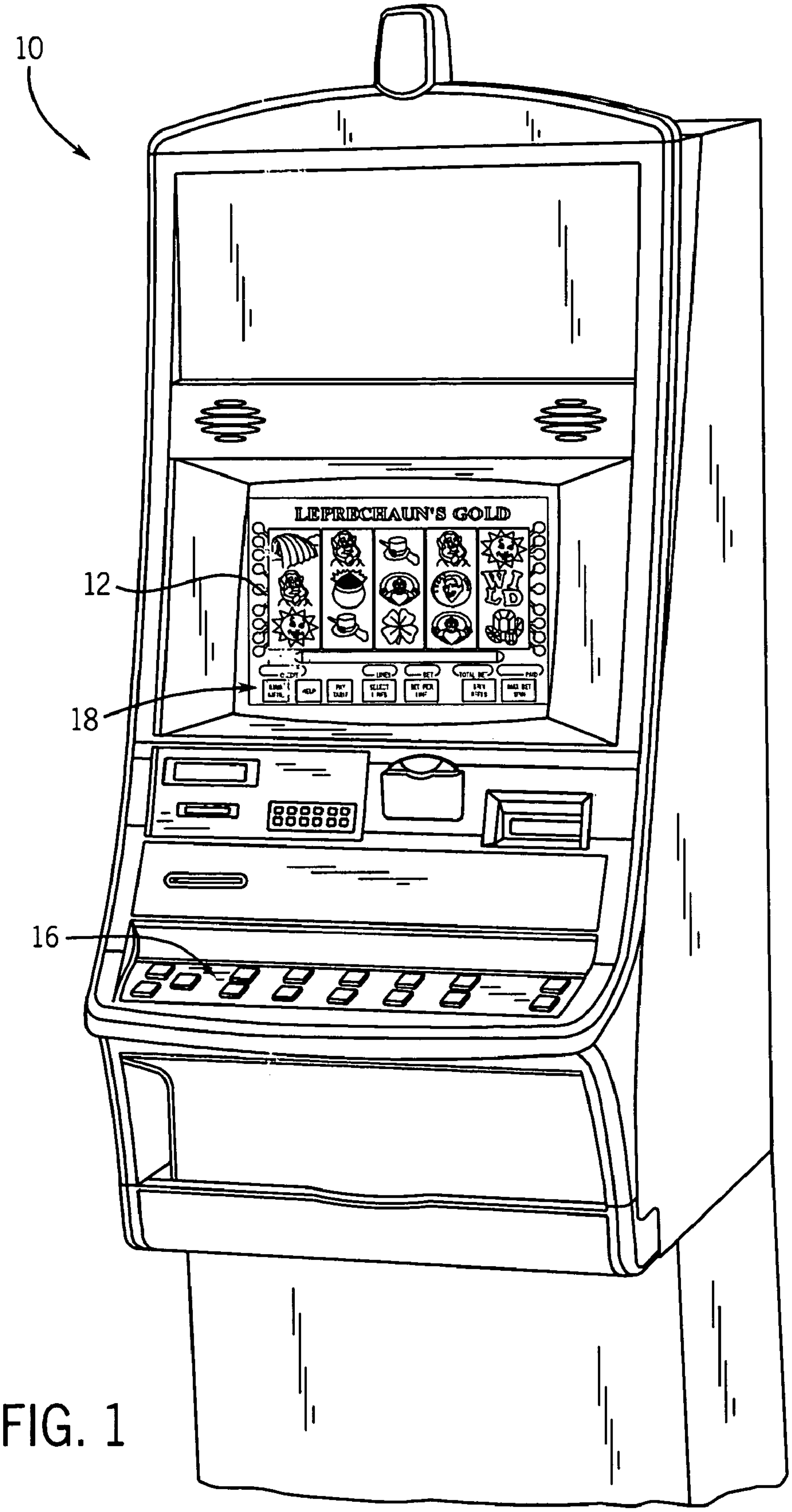
FIG. 1 is a front view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

FIG. 1 depicts a gaming machine 10 operable to conduct a slot-based wagering game. In operation, the gaming machine receives a wager from a player to purchase a "play" of the game. In a "play" of the game, the gaming machine generates at least one random event and provides an award to the player for a winning outcome of the random event. The random event may be internally or remotely determined using a random number generator or pooling schema. To portray the random event and outcome to the player, the gaming machine includes a primary display 12. If the wagering game is a reel slot game, for example, the primary display 12 includes a plurality of symbol-bearing reels that are rotated and stopped to place symbols on the reels in visual association with the pay line.

The primary display 12 may be implemented with a CRT, LCD, plasma, physical reels (in the case of a mechanical reel slot game), or other type of display known in the art. In the illustrated embodiment, the gaming machine 10 is an "upright" version in which the primary display 12 is oriented vertically relative to the player. Alternatively, the gaming machine may be a "slant-top" version in which the primary display 12 is slanted at about a thirty-degree angle toward the player of the gaming machine 10.

Figure 2:
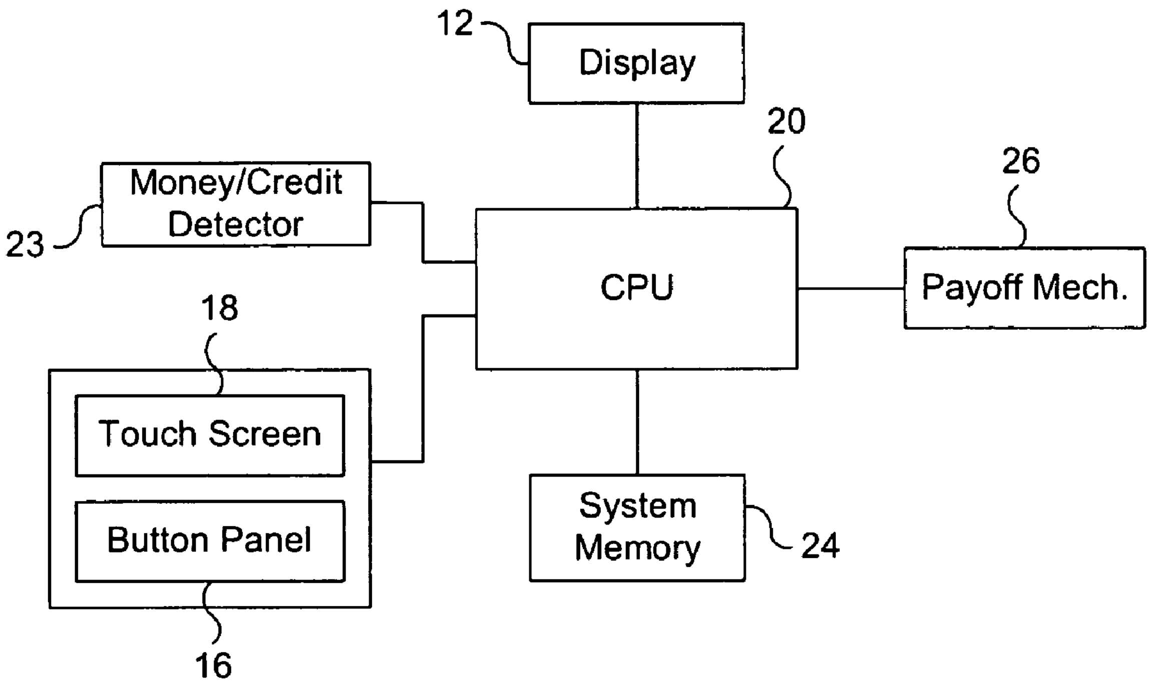
FIG. 2 is a block diagram of a control mechanism used for communication between interface components, a main processor, and display units of the gaming machine.

FIG. 2 is a block diagram of a control system suitable for operating the gaming machine. Money/credit detector 22 signals a central processing unit (CPU) 20 when a player has inserted money or played a number of credits. The money may be provided by coins, bills, tickets, coupons, cards, etc. Using a button panel 16 or a touch screen 18, the player may select any variables associated with the wagering game and place a wager to purchase a play of the game. In a play of the game, the CPU 20 generates at least one random event using a random number generator (RNG) and provides an award to the player for a winning outcome of the random event. The CPU 20 operates the primary display 12 to represent the random event(s) and outcome(s) in a visual form that can be understood by the player. In addition to the CPU 20, the control system may include one or more additional slave control units for operating the display 12 and other peripherals such as a secondary display.

System memory 24 stores control software, operational instructions and data associated with the gaming machine. In one embodiment, the system memory 24 comprises a separate read-only memory (ROM) and battery-backed random-access memory (RAM). However, it will be appreciated that the system memory 24 may be implemented on any of several alternative types of memory structures or may be implemented on a single memory structure. A payoff mechanism 26 is operable in response to instructions from the CPU 20 to award a payoff to the player. The payoff may, for example, be in the form of a number of credits. The number of credits is determined by one or more math tables stored in the system memory 24.

Referring to FIG. 1, to play the basic slot game, a player places a wager using the button panel 16 or the touch screen 18. In response to pressing the "spin reels" button, the CPU spins and randomly stops the plurality of symbol-bearing reels on the primary display 12 to place symbols on the reels in visual association with a pay line. Other mechanisms, such as a handle, may be used to set the reels in motion. The number of illustrated reels is five but a different number of reels may be provided if desired. The display 12 on which the reels are implemented may be mechanical or video. If the display 12 is mechanical, the reels are physical and rotatably driven by stepper motors. If, however, the display 12 is video, the reels are simulated with moving graphics. Although the basic game described herein is a reel slot game, it may be any game having one or more bonus rounds, including, for example, poker, keno, bingo, blackjack, or roulette.

The CPU uses a random number generator to select a game outcome (e.g., "basic" game outcome) corresponding to a particular set of reel "stop positions." The CPU then causes each of the reels to stop at the appropriate stop position. Symbols are displayed on the reels to graphically illustrate the reel stop positions and indicate whether the stop positions of the reels represent a winning game outcome.

Winning basic game outcomes (e.g., symbol combinations resulting in payment of coins or credits) are identifiable to the player by a pay table. The pay table is printed on a belly glass or top glass, or may be displayed on the main display 12 or secondary display, if offered and selected by the player. A winning basic game outcome occurs when the symbols appearing on the reels along an active pay line correspond to one of the winning combinations on the pay table. A winning combination, for example, could be five matching symbols along a pay line, where the award is greater as the number of matching symbols along the pay line increases. If the displayed symbols stop in a winning combination, the game credits the player an amount corresponding to the award in the pay table for that combination multiplied by the number of wagered credits. The player may collect the amount of accumulated credits by pressing a "Collect" key on the button panel 16.

Included among the plurality of basic game outcomes is a start-bonus outcome for triggering play of a bonus event. The start-bonus outcome may occur when a special start-bonus symbol or a special combination of symbols appears on one or more of the reels. The appearance of the start-bonus outcome causes the CPU to shift operation from the basic slot game to the bonus event.

The present invention applies directly to the basic game play mode and indirectly to the bonus game play mode. An internal meter or game play counter records the number of basic reel slot games played between bonus rounds. Based on the current value of the game play counter, various configurations are adjusted to maintain such mathematically determined settings as expected value (EV—for the basic reel game and the bonus game) and bonus hit rate. Referring to FIG. 3, two values are important when determining the number of times the bonus round is likely to occur: the game play counter 28 itself and the bonus hit rate 29. The counter's value is the number of basic reel slot games played since the end of the last bonus round. It is reset to zero (0) when the bonus round is triggered or when the player cashes out. In each case, the next time the reels are spun, the counter starts from zero. Any and all adjustments to parameters associated with the frequency of bonus play (hit rate) and the value returned (EV) are based on a current value on this counter. The bonus hit rate 29 is an average of the number of times during a set number of reel spins that a bonus round could trigger. Because the bonus is triggered randomly, a player may realize a bonus game frequently, or rarely. In accordance with the present invention, the bonus hit rate value changes if a threshold of basic reel slot games is reached without triggering a bonus game. For example, the first 40 spins generated by the player results in a bonus hit rate 29 of 1 in 100 spins. Should the threshold of 41 be reached on the game play counter 28, the bonus hit rate 29 would adjust to 1 in 80 spins. This rate is maintained until the threshold of 81 is reached. If the bonus has not been triggered by this count, the bonus hit rate 29 adjusts to 1 in 60. From 111 to 150 spins, the bonus hit rate 29 is 1 in 50 spins. If the game play counter 28 reaches 151 spins or higher, the bonus hit rate 29 adjusts to 1 in 30.

The foregoing thresholds and bonus hit rates may be varied from that described above. For example, after reaching the first threshold, subsequent thresholds could occur on each subsequent spin and result in a corresponding incremental increase in the bonus hit rate.

Continuing to refer to FIG. 3, a return in bonus 30 is maintained throughout the play of the game. Since this value is fixed, it has a direct effect on the expected value for both the reel slot games and bonus games played. The bonus expected value 31 is the result of the return in bonus 30 divided by the number of reel spins in the bonus hit rate 29. The expected value for the reel slot games 32 is a calculation based on a relatively standard (industry accepted) return value (increasing as thresholds are reached on the game play counter 28) minus the bonus expected value 31. The reels EV 32 and the bonus EV 31 change as the bonus hit rate 29 changes and as the number of reel slot games on the game play counter 28 increments past certain thresholds.

Figure 4:
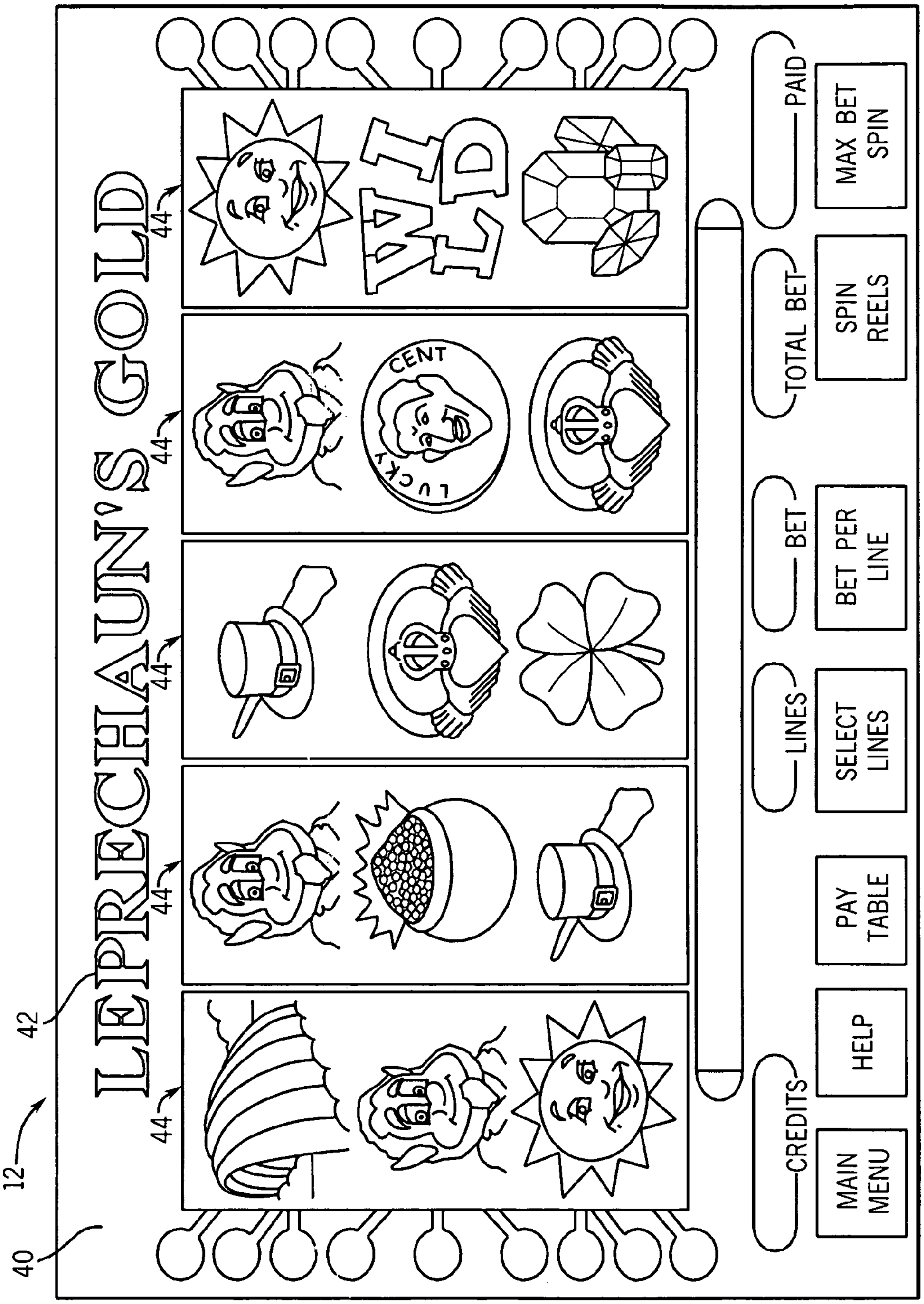
FIG. 4 is a display screen capture of a basic slot game executed on the gaming machine.

FIG. 4 is a display screen capture showing a basic reel slot game called Leprechaun's Gold. The display 12 shows the game in normal mode with the background 40, the title 42, and the reel 44 background displaying normal colors based on a color scheme of the game. In this example, the background 40 is a dark blue, the title 42 is green and gold, and the reel 44 background is white. These colors also directly relate to the current state of the game play counter which, in this example, is operating with a bonus hit rate of 1 in 100 and within the initial threshold of 40 games played since the last bonus round (refer to FIG. 3).

Figure 5:
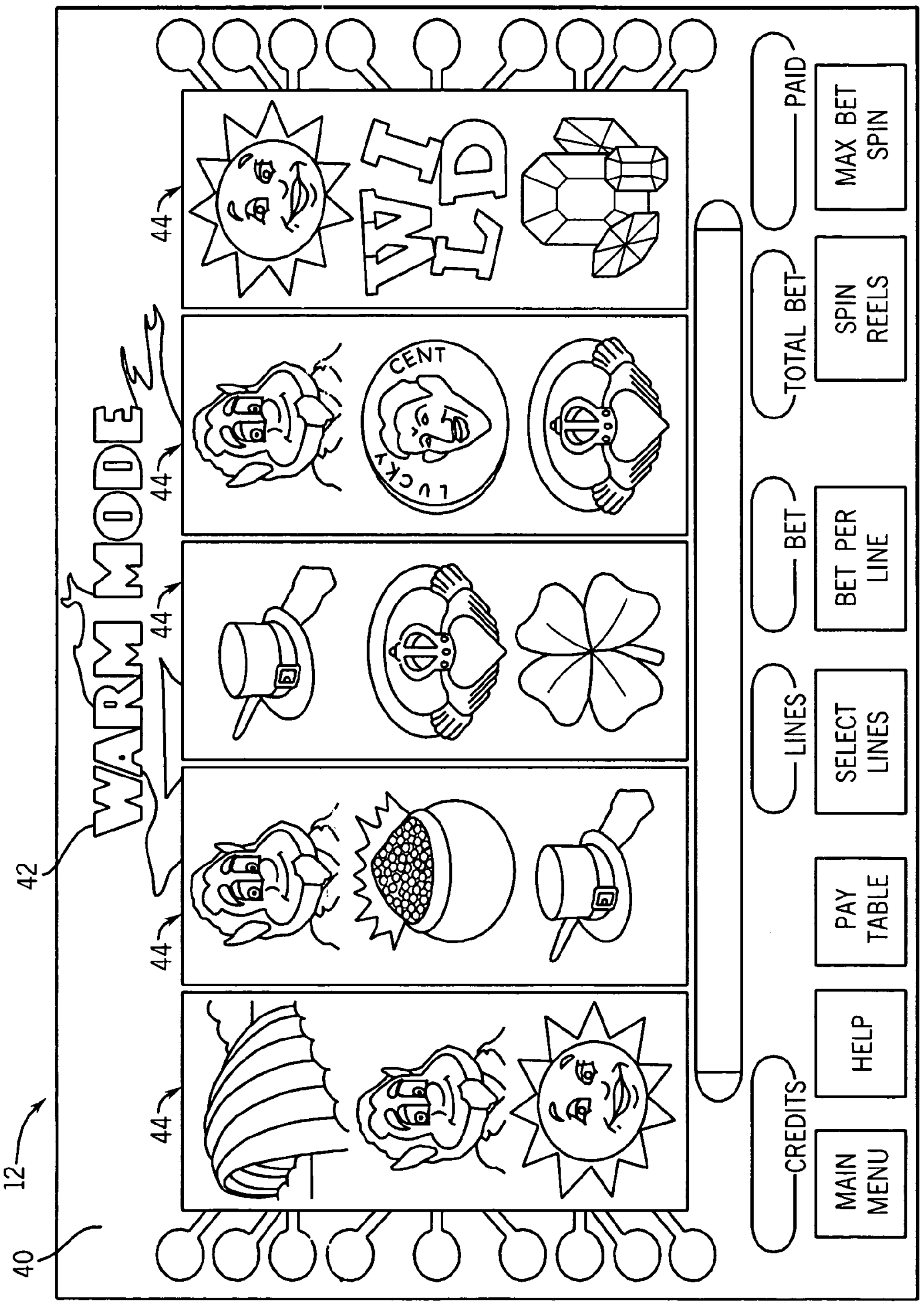
FIG. 5 is a display screen capture of a basic slot game executed on the gaming machine showing an entertaining representation of a first alteration of a bonus triggering potential.

FIG. 5 is a display screen capture of the Leprechaun's Gold game. The display 12 shows the game in warm mode with the background 40, the title 42 (changed from the name of the game to "Warm Mode"), and the reel 44 background displaying altered colors. In this example, the background 40 is a light orange, the title 42 is yellow and red with a small flame as a background, and the reel 44 background is a light peach color. These colors also directly relate to the current state of the game play counter which, in this example, is operating with a bonus hit rate of 1 in 80 and within the threshold of 41 to 80 games played since the last bonus round (refer to FIG. 3).

Figure 6:
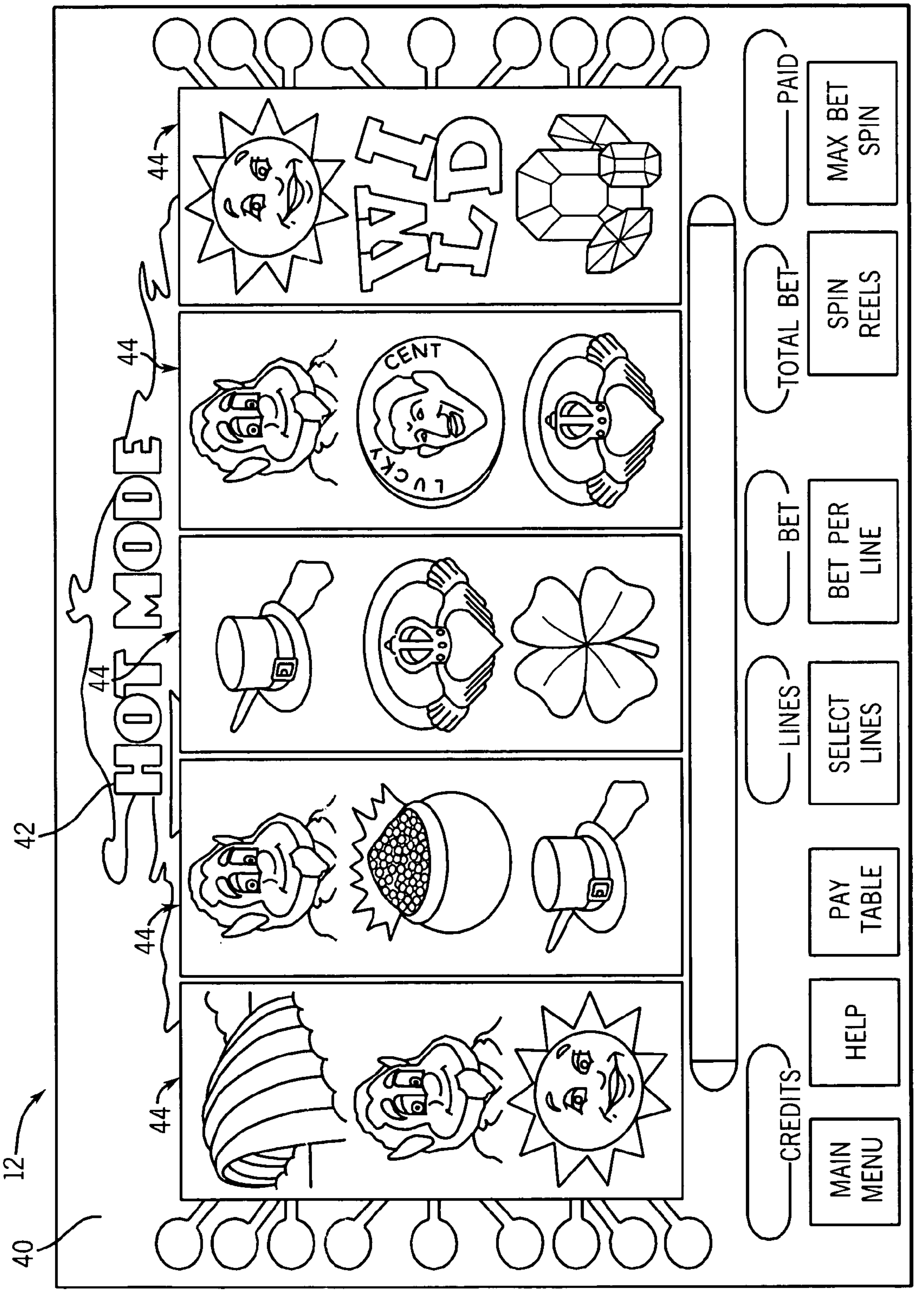
FIG. 6 is a display screen capture of a basic slot game executed on the gaming machine showing an entertaining representation of a second alteration of the bonus triggering potential.

FIG. 6 is a display screen capture of the Leprechaun's Gold game. The display 12 shows the game in hot mode with the background 40, the title 42 (changed to "Hot Mode"), and the reel 44 background displaying altered colors. In this example, the background 40 is a light red, the title 42 is yellow and red with a larger flame as a background, and the reel 44 background is a light orange color. These colors also directly relate to the current state of the game play counter which, in this example, is operating with a bonus hit rate of 1 in 60 and within the threshold of 81 to 110 games played since the last bonus round (refer to FIG. 3).

Figure 7:
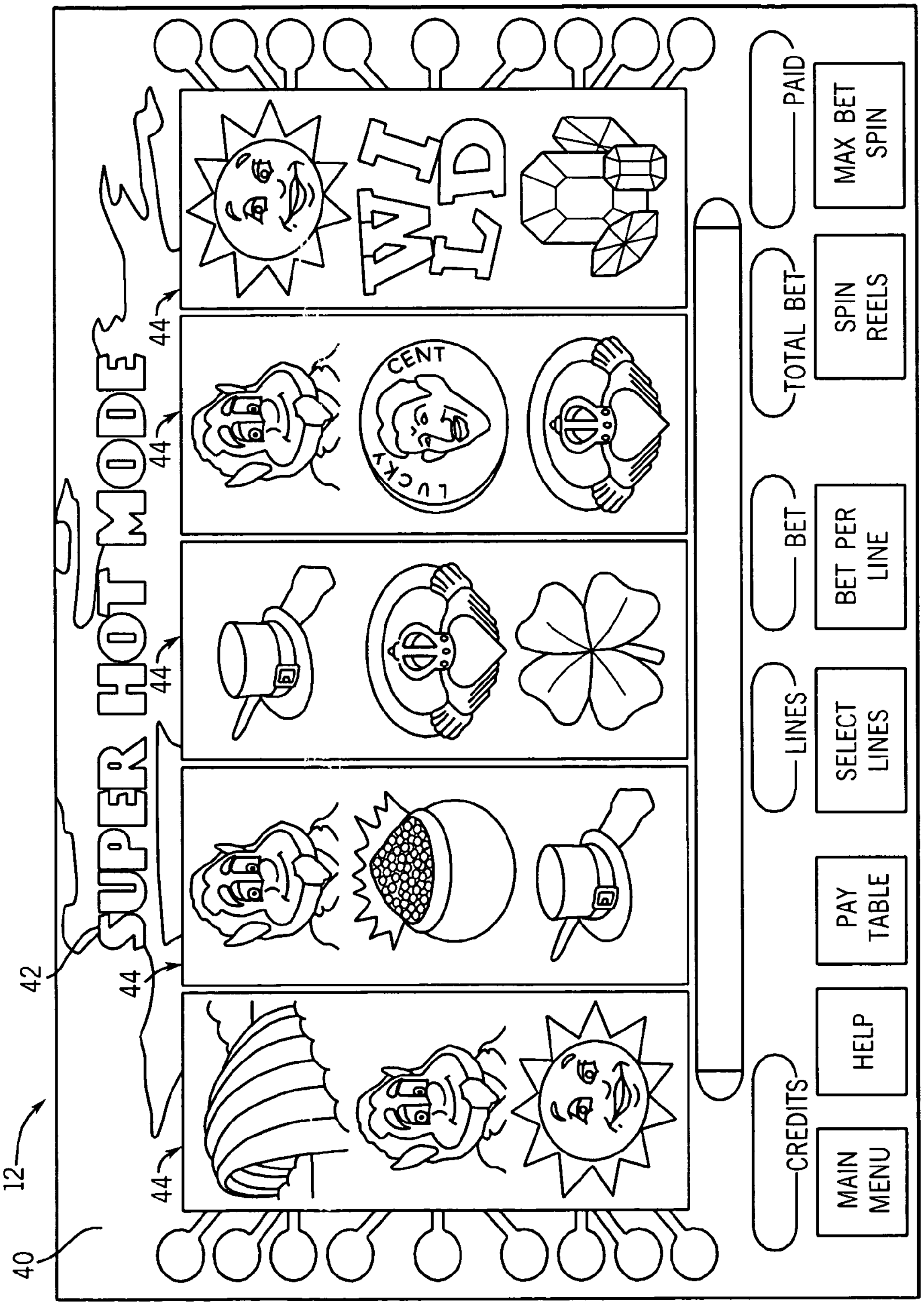
FIG. 7 is a display screen capture of a basic slot game executed on the gaming machine showing an entertaining representation of a third alteration of the bonus triggering potential.

FIG. 7 is a display screen capture of the Leprechaun's Gold game. The display 12 shows the game in super hot mode with the background 40, the title 42 (changed to "Super Hot Mode"), and the reel 44 background displaying altered colors. In this example, the background 40 is a deep red, the title 42 is yellow and red with a very large flame as a background, and the reel 44 background is a deeper orange color. These colors also directly relate to the current state of the game play counter which, in this example, is operating with a bonus hit rate of 1 in 50 and within the threshold of 111 to 150 games played since the last bonus round (refer to FIG. 3).

Figure 8:
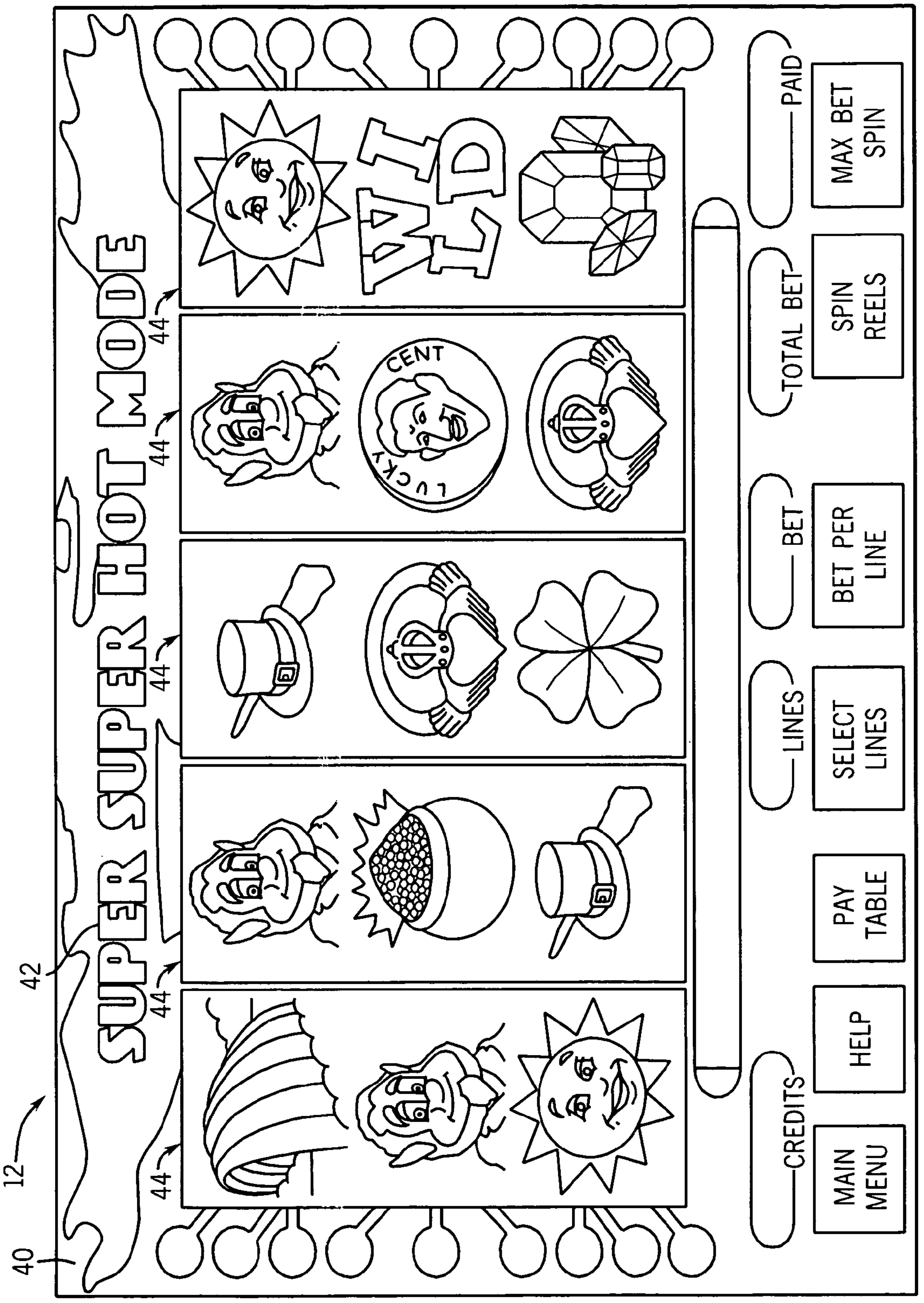
FIG. 8 is a display screen capture of a basic slot game executed on the gaming machine showing an entertaining representation of a final alteration of the bonus triggering potential.

FIG. 8 is a display screen capture of the Leprechaun's Gold game. The display 12 shows the game in super super hot mode with the background 40, the title 42 (changed to "Super Super Hot Mode"), and the reel 44 background displaying altered colors. In this example, the background 40 is a deep red, the title 42 is yellow and red with a flame covering almost the entire background, and the reel 44 background is a deep orange color. These colors also directly relate to the current state of the game play counter which, in this example, is operating with a bonus hit rate of 1 in 30 and above the threshold of 151 games played since the last bonus round (refer to FIG. 3).

While the present invention has been described with reference to one or more particular embodiments, those skilled in the art will recognize that many changes may be made thereto without departing from the spirit and scope of the present invention.

For example, should a reel slot based gaming machine offer more than one type of bonus during play, a game play counter could exist for each bonus game type. The hit rate and expected value could be adjusted for each type of bonus game offered through the basic reel slot game.

Another embodiment includes a variation of the configuration shown in FIG. 3. Referring to FIG. 9, the reel slot game could be configured to react to the game play counter 48 and adjust the bonus hit rate 49 in the following manner: all reel slot game expected values 52 could be fixed with the bonus expected values 51 increasing as the game play counter 48 increments past certain thresholds. The bonus hit rates 49 would increment in a more ordered fashion and the game play counter 48 could have smaller ranges. Other variations to this configuration could be deployed as long as the gaming machine maintains an expected value generally accepted in the industry.

In yet another embodiment, the display of the increased probabilities of triggering the bonus to the player can be optional. The game's adjustment of the triggering probability can be completely hidden.

In a further embodiment, the game play counter is replaced with a clock or timer that measures the length of time (e.g., in seconds or minutes) since the bonus game was last triggered by the basic game.

Each of these embodiments and obvious variations thereof is contemplated as falling within the spirit and scope of the claimed invention, which is set forth in the following claims.

What is claimed is:

1. A method of conducting a wagering game, the wagering game including a basic game and a bonus game, the method comprising:

tracking a number of the basic games played on a wagering game machine or on a wagering game system since a predetermined event using a processor and a memory, the processor being configured to update the memory to count the number of basic games played since the predetermined event;

providing a first probability of triggering the bonus game;

providing, in the memory or in another memory, a schedule that triggers the bonus game responsive to the counted number of basic games played since the predetermined event, the schedule comprising a plurality of different probabilities, the probability of triggering the bonus game increasing in the schedule with an increasing number of basic games played since the predetermined event; and automatically altering the first probability of triggering the bonus game to a second probability based on the counted number attaining at least a first predetermined threshold, the second probability being greater than the first probability but less than one-hundred percent, wherein the predetermined event comprises a bonus name or a triggering event for a bonus game.

2. The method of claim 1, wherein the altering step includes altering the first probability when the counted number reaches a predetermined threshold.

3. The method of claim 1, wherein the altering step includes altering the second probability when the counted number reaches a second predetermined threshold.

4. The method of claim 1, wherein the altering step includes successively altering the first probability when the counted number reaches each threshold of a plurality of predetermined thresholds.

5. The method of claim 1, wherein the altering step includes increasing the first probability of triggering the bonus game based on the counted number.

6. The method of claim 1, further including displaying an indication of the first and second probability to a player.

7. A method of conducting a wagering game, the wagering game including a basic game and a bonus game triggered by the basic game, the method comprising:

tracking a frequency of occurrence of the bonus game on a wagering game machine or on a wagering game system using a processor and a memory, the processor being configured to update the memory to count the number of basic games played since the predetermined event; and automatically increasing an expected value of a bonus game in accord with a tiered schedule comprising a plurality of expected values, each expected value being correlated to a specific frequency of occurrence of the bonus game, the automatic altering of the probability being based on the tracked frequency, the tiered schedule being stored in the memory or in another memory, wherein the predetermined event comprises a bonus name or a triggering event for a bonus game.

8. The method of claim 7, wherein the altering step includes altering the expected value of the bonus game when the counted number reaches a predetermined threshold.

9. The method of claim 7, wherein the altering step includes altering the expected value of the bonus game when the counted number reaches a first predetermined threshold and altering the expected value of the bonus game again when the counted number reaches a second predetermined threshold.

10. The method of claim 7, wherein the altering step includes decreasing the expected value of the basic game with each increase in the expected value of the bonus game.

11. The method of claim 7, wherein the expected value of the bonus game is automatically decremented responsive to a triggering of the bonus game or responsive to a completion of a bonus game.

12. The method of claim 7, wherein the expected value of the bonus game or the altering of the expected value of the bonus game is not displayed to the player.

13. A method of conducting a wagering game on a wagering game machine or on a wagering game system, the wagering game including a basic game and a bonus game triggered by the basic game, the method comprising:

automatically altering a probability of triggering the bonus game associated with the wagering game machine or the wagering game system to a higher probability in accord with a schedule for triggering the bonus game responsive to a counted number of basic games played since the bonus game was last triggered by the basic game;

counting the number of basic games played since the bonus game was last triggered by the basic game using a processor and storing the counted number of basic games played since the bonus game was last triggered by the basic came in a memory;

storing the schedule that triggers the bonus game being in the memory or in another memory, the schedule comprising a plurality of different probabilities;

increasing, in accord with the schedule, the probability of triggering the bonus game with an increasing number of basic games played since the last triggering of the bonus game by the basic game, the higher probability being less than one-hundred percent.

14. A method of conducting a wagering game on a wagering game machine or on a wagering game system, the wagering game including a basic game and a bonus game triggered by the basic game, the method comprising:

automatically altering a probability of triggering the bonus game associated with the wagering game machine or the wagering game system to a higher probability in accord with a schedule that triggers the bonus game responsive to a length of time since the bonus game was last triggered by the basic game;

determining the length of time since the bonus game was last triggered by the basic game using a processor and storing the length of time since the bonus game was last triggered by the basic game in a memory;

storing the schedule that triggers the bonus game in the memory of in another memory, the schedule comprising a plurality of different probabilities;

increasing, in accord with the schedule, the probability of triggering the bonus game with an increasing length of time since the bonus game was last triggered by the basic game, the higher probability being less than one-hundred percent.

15. The method of claim 14, wherein the probability of triggering the bonus game is automatically decremented responsive to a triggering of the bonus game or responsive to a completion of a bonus game.

16. A gaming apparatus for conducting a wagering game on a wagering game terminal, the wagering game including a basic game and a bonus game, the apparatus comprising:

a control system operative to count a number of the basic games played since a predetermined event and to automatically alter a probability of triggering the bonus game to a higher probability, the higher probability being less than one-hundred percent, the altering of the probability of triggering the bonus game being based on the counted number and being independent of any single game outcome, wherein the increased probabilities of triggering the bonus to the player are not displayed to the player, wherein the predetermined event comprises a bonus game or a triggering event for a bonus game.

17. The apparatus of claim 16, wherein the control system is operative to alter the probability when the counted number reaches a predetermined threshold.

18. The apparatus of claim 16, wherein the control system is operative to alter the probability when the counted number reaches a first predetermined threshold and alter the probability again when the counted number reaches a second predetermined threshold.

19. The apparatus of claim 16, wherein the control system is operative to successfully alter the probability when the counted number reaches each threshold of a plurality of predetermined thresholds.

20. The apparatus of claim 16, wherein the control system is operative to increase the probability of triggering the bonus game based on the counted number.

21. The apparatus of claim 16, further including a display for displaying an indication of the probability to a player.

* * * * *

UNITED STATES PATENT AND TRADEMARK OFFICE
CERTIFICATE OF CORRECTION

PATENT NO. : 7,704,137 B2
APPLICATION NO. : 10/760699
DATED : April 27, 2010
INVENTOR(S) : Allon G. Englman It is certified that error appears in the above-identified patent and that said Letters Patent is hereby corrected as shown below:

In the Claims:

Column 6
Claim 1
Line 66: wherein the predetermined event comprises a bonus “name”

CHANGE TO: wherein the predetermined event comprises a bonus --game--

Column 7
Claim 7
Line 31: wherein the predetermined event comprises a bonus “name”

CHANGE TO: wherein the predetermined event comprises a bonus --game--

Column 7
Claim 13
Line 66: basic “came” in a memory;

CHANGE TO: basic --game-- in a memory;

Column 8
Claim 19
Line 57: is operative to “successfully” alter the probability when the CHANGE TO: is operative to --successively-- alter the probability when the Signed and Sealed this Thirty-first Day of August, 2010

David J. Kappos

David J. Kappos
*Director of the United States Patent and Trademark Office*